(12) United States Patent
Schneider

(10) Patent No.: US 8,944,295 B2
(45) Date of Patent: Feb. 3, 2015

(54) ROTARY VALVE WITH PRODUCT RELIEF GROOVES

(71) Applicant: Pelletron Corporation, Lancaster, PA (US)

(72) Inventor: Heinz Schneider, Lancaster, PA (US)

(73) Assignee: Pelletron Corporation, Lancaster, PA (US)

(*) Notice: Subject to any disclaimer, the term of this patent is extended or adjusted under 35 U.S.C. 154(b) by 26 days.

(21) Appl. No.: 13/708,161

(22) Filed: Dec. 7, 2012

(65) Prior Publication Data

US 2013/0146797 A1   Jun. 13, 2013

Related U.S. Application Data

(60) Provisional application No. 61/569,469, filed on Dec. 12, 2011.

(51) Int. Cl.
| *F16K 27/00* | (2006.01) |
| *F16K 27/06* | (2006.01) |
| *B65G 53/46* | (2006.01) |

(52) U.S. Cl.
CPC .............. *F16K 27/00* (2013.01); *F16K 27/065* (2013.01); *B65G 53/4633* (2013.01)
USPC .............................. 222/368; 222/344; 251/304

(58) Field of Classification Search
CPC ....................................................... F16K 27/00
USPC ................... 222/344, 345, 368, 367; 251/304
See application file for complete search history.

(56) References Cited

U.S. PATENT DOCUMENTS

| 2,126,425 | A | * | 8/1938 | Thompson et al. | 222/368 |
| 3,118,575 | A | * | 1/1964 | McCauley | 222/349 |
| 3,782,608 | A | * | 1/1974 | Schneider | 222/368 |
| 3,923,125 | A | * | 12/1975 | Rosenthal | 184/6 |
| 4,666,069 | A | * | 5/1987 | Morine et al. | 222/368 |
| 4,823,993 | A | * | 4/1989 | Siegel et al. | 222/345 |
| 5,114,053 | A | * | 5/1992 | Beirle | 222/345 |
| 5,129,554 | A | * | 7/1992 | Futamura | 222/368 |
| 5,320,258 | A | * | 6/1994 | Paul | 222/345 |
| 5,381,933 | A | | 1/1995 | Beirle | |
| 5,620,116 | A | * | 4/1997 | Kluger et al. | 222/368 |
| 7,757,903 | B2 | * | 7/2010 | Schwartz et al. | 222/368 |
| 7,922,044 | B2 | * | 4/2011 | Luchinger | 222/344 |

FOREIGN PATENT DOCUMENTS

CN          201634211 U   *  11/2010

* cited by examiner

*Primary Examiner* — Donnell Long
(74) *Attorney, Agent, or Firm* — Miller Law Group, PLLC

(57) ABSTRACT

A rotary valve meters the flow of particulate material from a supply source into a pneumatic conveying system and includes a central rotor rotatable within a cylindrical housing. The interior surface of the cylindrical housing is formed with grooves extending from pinch points at the inlet opening to facilitate the passage of particulate material past the pinch points without being trapped between the rotor vanes and the housing. The grooves are preferably formed in a configuration that has an increasing depth from the proximal wall to the distal wall, and preferably is configured with a spiraled surface shaped to increase the depth of the groove channel to a rounded end chamber at the distal wall. The groove channels can be oriented in alignment with a triangular ridge, in a circumferential direction perpendicular to the direction of movement of the rotor, or perpendicular to the angle of the triangular ridge.

25 Claims, 11 Drawing Sheets

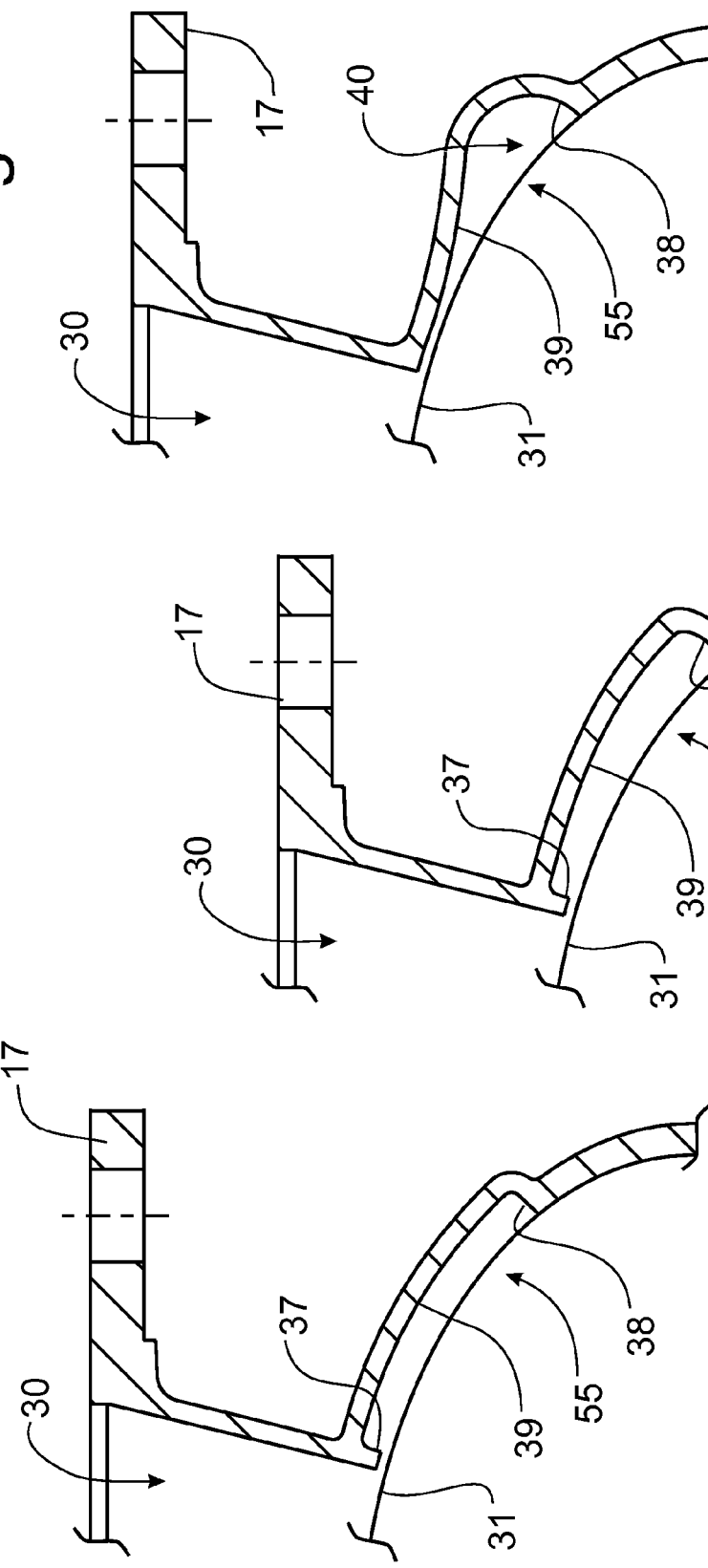
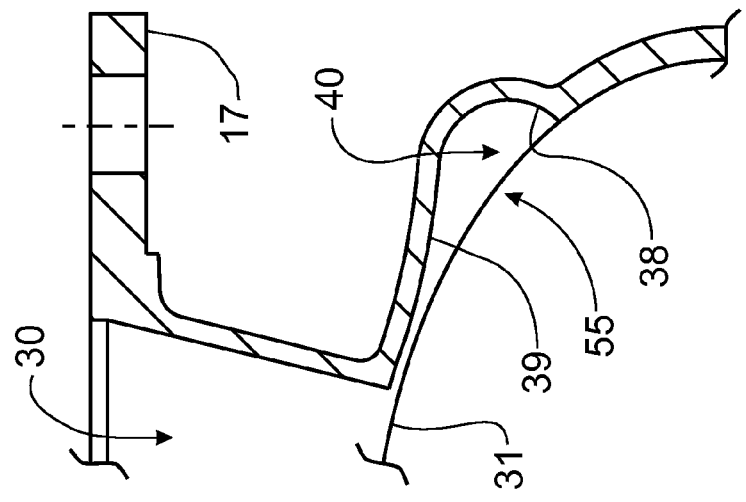
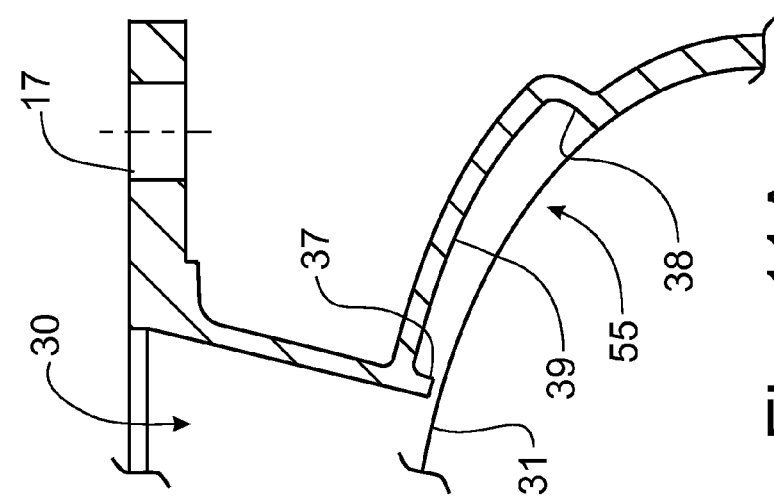

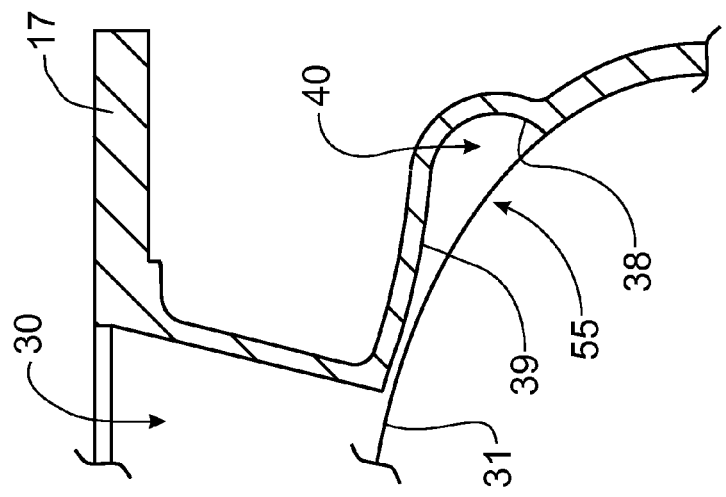
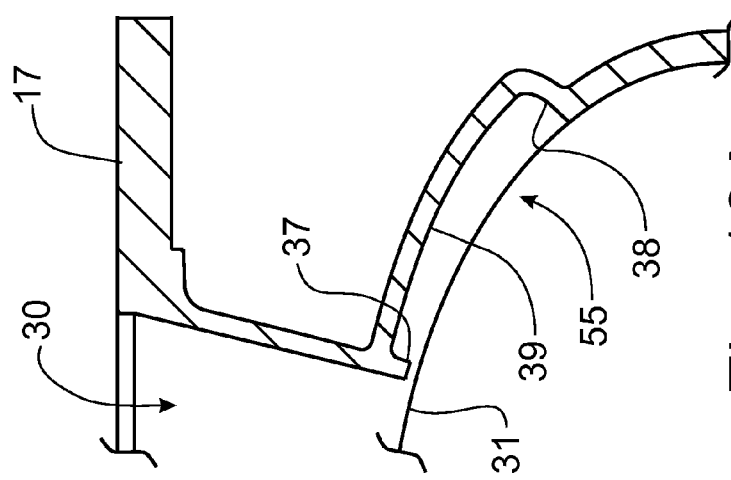
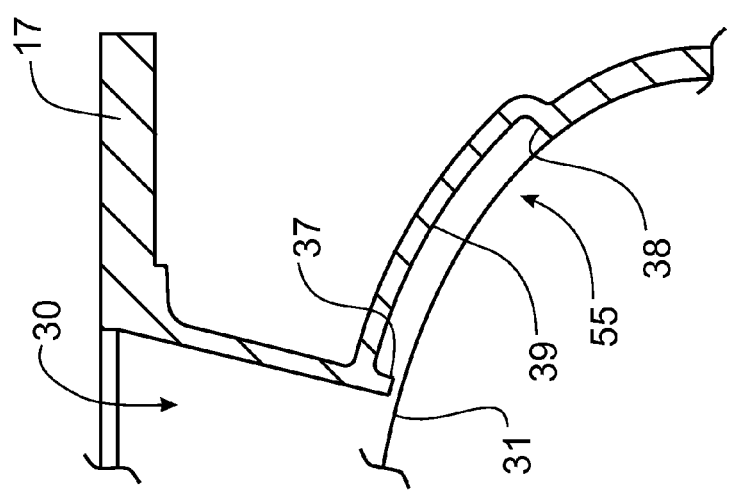

ROTARY VALVE WITH PRODUCT RELIEF GROOVES

CROSS-REFERENCE TO RELATED APPLICATIONS

This application claims domestic priority on U.S. Provisional Patent Application Ser. No. 61/569,469, filed Dec. 12, 2011, and entitled "Rotary Valves with Product Relief Grooves", the contents of which are incorporated herein by reference.

FIELD OF THE INVENTION

The invention disclosed in this application is directed generally to a rotary valve used to input particulate material into a pneumatic conveying system, and particularly to a rotor configuration that reduces the creation of fines while conveying the particulate material through the rotor, thereby enhancing the quality of the particulate material being inputted into the pneumatic conveying system.

BACKGROUND OF THE INVENTION

Rotary valves are well known in the art as a mechanism for introducing a flow of particulate material into a pressurized pneumatic conveying system. The pneumatic conveying system utilizes a flow of pressurized air through a pipe or tubular conduit to establish a fluidized flow of the particulate material fed into the conduit to move the particulate material from one place to another. The rotary valve has a housing defining an inlet opening at the top for the introduction of particulate material and a discharge opening at the bottom to discharge the particulate material flowing through the rotary valve into the pneumatic conveying system conduit. The housing rotatably supports an internal rotor for movement about a transverse, horizontal axis of rotation. The rotor is formed with a plurality of radially extending vanes that define chambers therebetween.

Preferably, the inlet opening has a triangular ridge at the throat of the opening projecting from the housing into the inlet opening. This triangular ridge creates an angular point of interaction with the rotor vanes rotatably moving within the rotor housing to direct particulate material to the sides and, thus, reduce pinch points defined between lines of the housing and the lines of the rotor vanes. Rotary valves without a triangular ridge structure will have a pinch point where the rotor vanes meet a parallel surface of the inlet opening. Rotary valves with the triangular ridge structure will ultimately have a pinch point where the rotor vanes cross a concave angular structure. Such pinch points can trap individual pellets of the particulate material between the housing and the rotor vanes and result in damage to the trapped pellets. Damaged pellets create undesirable fines within the flow of particulate material.

Each respective chamber receives a supply of particulate material when rotated to be opened to the upper inlet opening and then deposits the particulate material into the conduit when the chamber is rotated around the axis of rotation and opens to the conduit. The interior of the housing is, therefore, formed in a generally cylindrical shape so that the outer tips of the radially extending vanes pass in close proximity to the interior cylindrical surface of the housing to restrict leakage of pressurized air from the conduit around the rotor. The triangular ridge does create pinch points at the intersection of the triangular ridge and the periphery of the inlet opening. These pinch points do not result in much damage to the individual pellets as the angularly disposed triangular ridge intersects with the inlet opening to create an acute angle at the pinch point; nevertheless, individual pellets can become trapped at these pinch points.

Taiwan Patent No. M384858, granted to Yi-Ting Xie, et al, on Nov. 17, 2010, discloses the formation of a groove at each of the two pinch points created by the triangular ridge intersecting with the inlet opening in the housing. These grooves are formed as channels in the cylindrical surface of the rotor housing extending outwardly from the two aforesaid pinch points in line with the angle of the triangular ridge. The cross-section of the channel is depicted in FIG. 4 of Taiwan Patent No. M384858 and is formed as a rectangular channel having a proximal wall at the pinch point that is recessed into the cylindrical housing to allow relief from the pinch point and allow the passage of individual pellets of particulate material past the pinch point into the groove. The distal wall of the channel defines a depth of the channel into which particulate material can accumulate. The overall depth of the groove channel is substantially uniform from the proximal wall to the distal wall.

In U.S. Pat. No. 5,381,933, issued to Walter Beirle, et al., on Jan. 17, 1995, a rotary valve for transferring particulate material is disclosed with a baffle structure located within the throat of the inlet opening. The baffle structure in the Beirle patent creates pinch points where the baffle intersects with other side structure of the inlet opening. To provide a relief for the particulate material getting trapped in these pinch points, the Beirle patent provides a pair of grooves oriented in alignment with the side structure and positioned beneath the baffle structure. The Beirle grooves meet at an apex which is located in the center of the rotary valve.

In operation, the passage of the rotor vane past the proximal wall can establish an eddy current of air behind the proximal wall to restrict the use of the depth of the channel at the proximal wall. Furthermore, the uniform depth of the groove channel can result in the compaction of particulate material at the distal wall. If the particulate material compacts at the distal wall, the sweeping movement of the rotor vanes will not effect a deflection of the individual pellets into the groove channel, resulting in the pellets getting trapped between the top of the distal wall and the rotor vane. Furthermore, fines can accumulate in the ceiling of the groove channel to present a difficult cleaning problem when the rotary valve is used in conjunction with a new particulate product.

Accordingly, it would be desirable to provide a rotary valve that further reduces the creation of fines in the transfer of particulate material into a pneumatic conveying system connected to the rotary valve.

SUMMARY OF THE INVENTION

It is an object of this invention to overcome the aforementioned disadvantages of the prior art by providing a rotary valve having a rotor construction that will reduce the creation of fines during operation thereof.

It is another object of this invention to provide a rotary valve having a rotor configuration that includes a rotor housing formed with grooves extending outwardly from pinch points at the inlet opening structure.

It is still another object of this invention to provide a groove configuration for the rotor housing that will discourage the compaction of particulate pellets within the groove.

It is a feature of this invention that the rotor is formed with grooves extending into the cylindrical interior surface of the rotor housing and aligned with the angle of the triangular ridge formed in the inlet opening throat.

It is another feature of this invention that the grooves are configured to increase in depth from the proximal wall toward the distal wall of the groove.

It is an advantage of this invention that the particulate pellets will not compact in the groove having an increasing depth configuration.

It is another advantage of this invention that the sweeping movement of the rotor vanes past the groove channel extracts particulate pellets from the groove into the chamber of the rotor between the rotor vanes.

It is still another feature of this invention that the groove channel can be formed in a spiraled configuration extending from the proximal wall and increasing the depth of the groove channel toward the distal wall of the channel and terminating in a rounded end chamber at the distal wall.

It is yet another feature of this invention that the rotor is formed with grooves extending into the cylindrical interior surface of the rotor housing and aligned with the circumference of the cylindrical rotor housing so that the groove is perpendicular to the path of movement of the rotor vanes It is a further feature of this invention that the rotor is formed with grooves extending into the cylindrical interior surface of the rotor housing and aligned to be generally perpendicular to the angle of the triangular ridge formed in the inlet opening throat.

It is still a further feature of this invention that the grooves can be angled inwardly along the interior surface of the rotor housing to join together at a apex at the center of the rotor housing.

It is yet another feature of this invention that the sweeping movement of the vane tips along the groove channels pushes the particulate pellets into the groove channel without compacting due to the increasing depth of the groove channel.

It is a further advantage of this invention that the operation of the rotor vanes against the groove channels results in a cleaner particulate material being transferred to the pneumatic conveying system due to the reduced creation of fines during the rotational operation of the rotor within the rotor housing.

It is still another advantage of this invention that the rotor housing is easily cleaned with a water spray as the lack of compaction of the particulate material within the groove facilitates the removal of the material from the grooves.

It is a further object of this invention to provide a rotary valve that is operable in a manner to reduce the creation of fines while transferring particulate material to a pneumatic conveying system, which is durable in construction, inexpensive of manufacture, carefree of maintenance, facile in assemblage, and simple and effective in use.

These and other objects, features and advantages are accomplished according to the instant invention by providing a rotary valve for metering the flow of particulate material from a supply source into the air stream of a pneumatic conveying system that includes a central rotor formed with a plurality of vanes that rotate within a cylindrical rotor housing. The interior surface of the cylindrical housing is formed with grooves extending from pinch points at the inlet opening to facilitate the passage of particulate material past the pinch points without being trapped between the rotor vanes and the housing and creating fines. The grooves are preferably formed in a configuration that has an increasing depth from the proximal wall to the distal wall, and preferably is configured with a spiraled surface that is shaped to increase the depth of the groove channel to a rounded end chamber at the distal wall. The groove channels can be oriented in alignment with a triangular ridge, in a circumferential direction perpendicular to the direction of movement of the rotor, or perpendicular to the angle of the triangular ridge.

BRIEF DESCRIPTION OF THE DRAWINGS

The advantages of this invention will become apparent upon consideration of the following detailed disclosure of the invention, especially when taken in conjunction with the accompanying drawings wherein:

FIG. 11 is a partial cross-sectional view of the rotor housing depicting a first groove configuration for the embodiment of the invention shown in FIG. 5;

FIG. 11A is a partial cross of the rotor housing depicting a second groove configuration for the embodiment of the invention shown in FIG. 5;

FIG. 12 is a partial cross-sectional view of the rotor housing depicting a third groove configuration for the embodiment of the invention shown in FIG. 5;

FIG. 13 is a partial cross-sectional view of the rotor housing depicting a first groove configuration for the embodiment of the invention shown in FIG. 7;

FIG. 13A is a partial cross of the rotor housing depicting a second groove configuration for the embodiment of the invention shown in FIG. 7; and FIG. 14 is a partial cross-sectional view of the rotor housing depicting a third groove configuration for the embodiment of the invention shown in FIG. 7.

DETAILED DESCRIPTION OF THE PREFERRED EMBODIMENT

Figure 1:
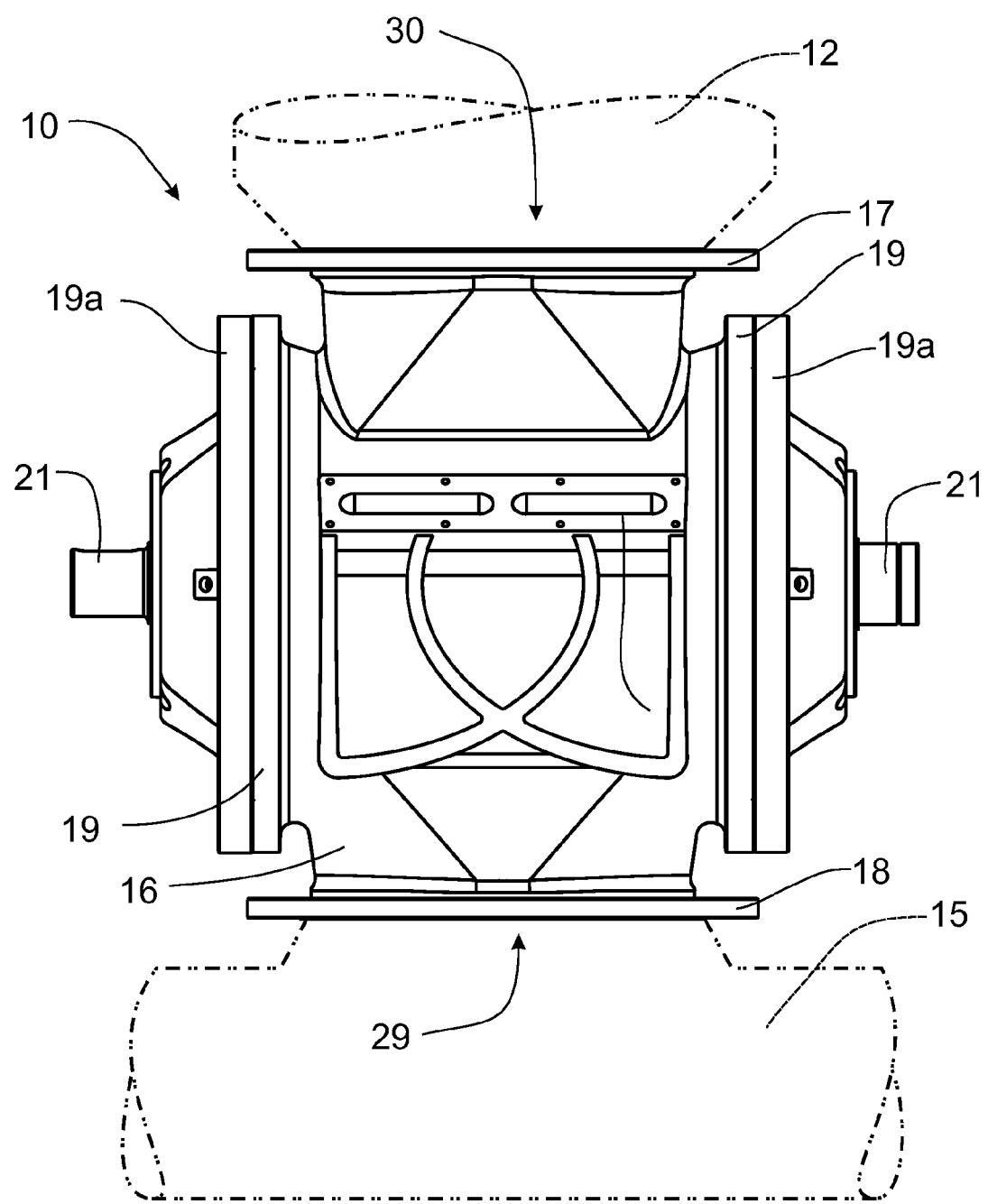
FIG. 1 is a front elevational view of a rotary valve incorporating the principles of the instant invention, the supply hopper and the conduit of the pneumatic system being shown in phantom connected to the rotary valve.
Figure 2:
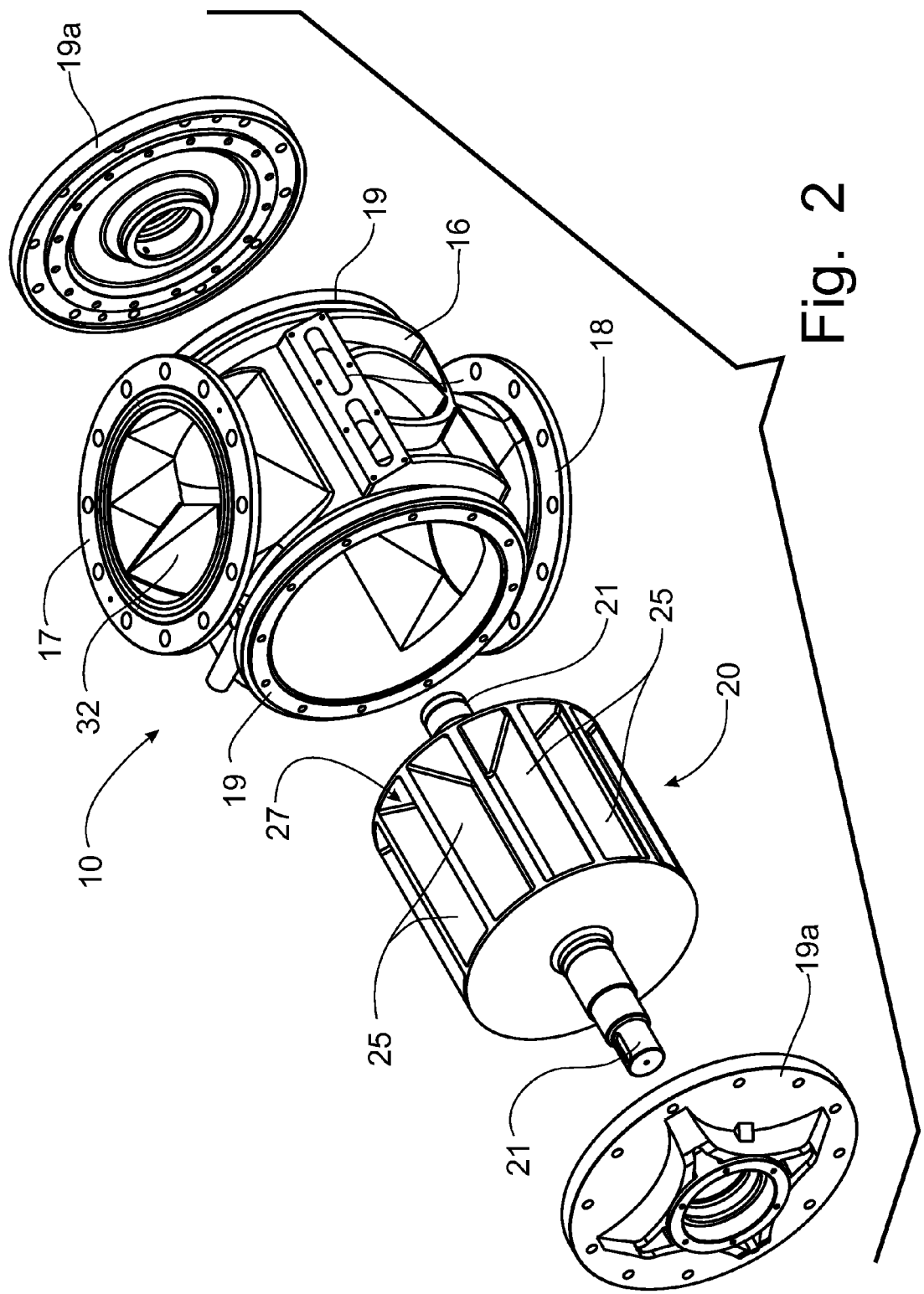
FIG. 2 is an exploded perspective view of the rotary valve shown in FIG. 1.
Figure 3:
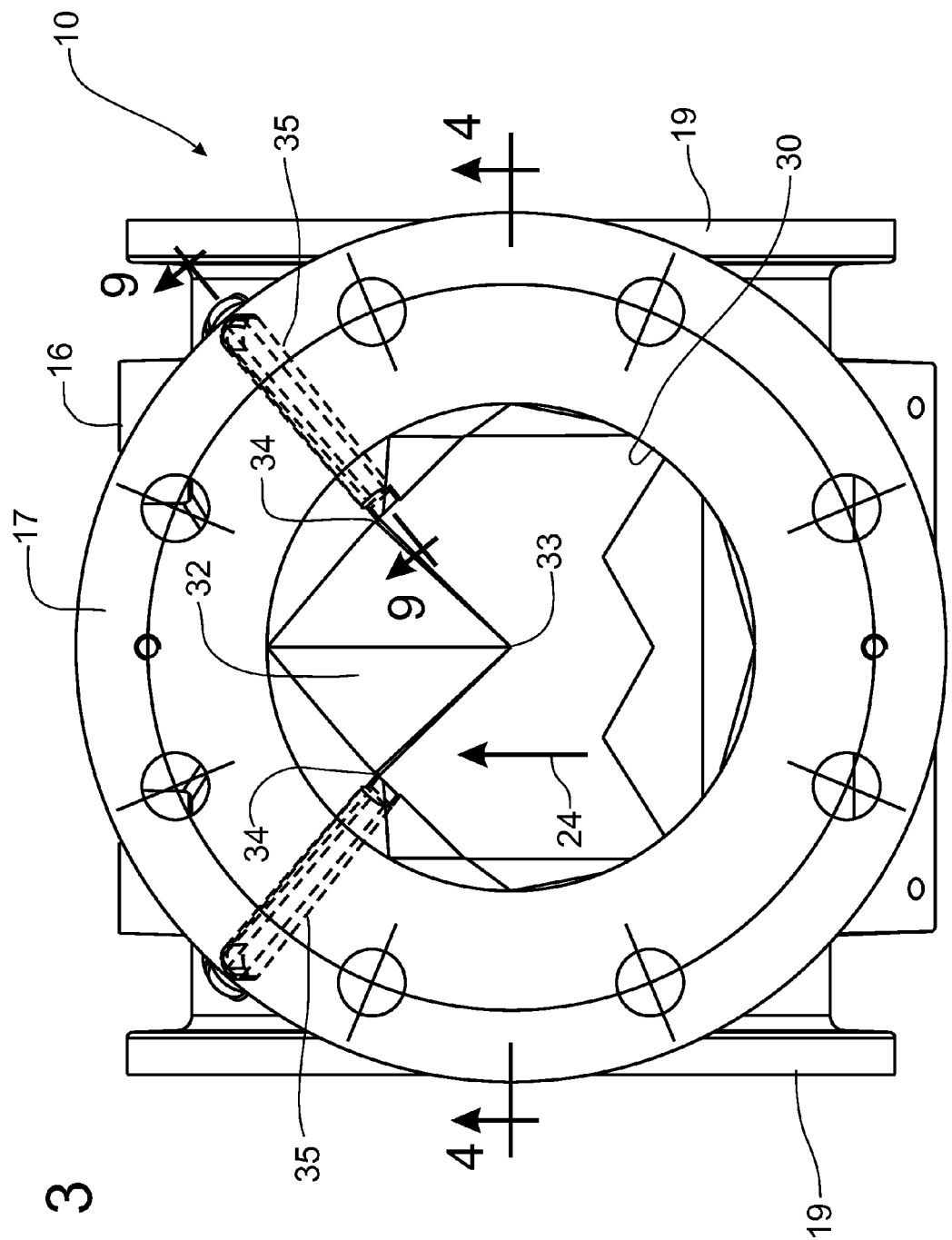
FIG. 3 is an enlarged top plan view of a first embodiment of the rotor housing incorporating the principles of the instant invention.
Figure 4:
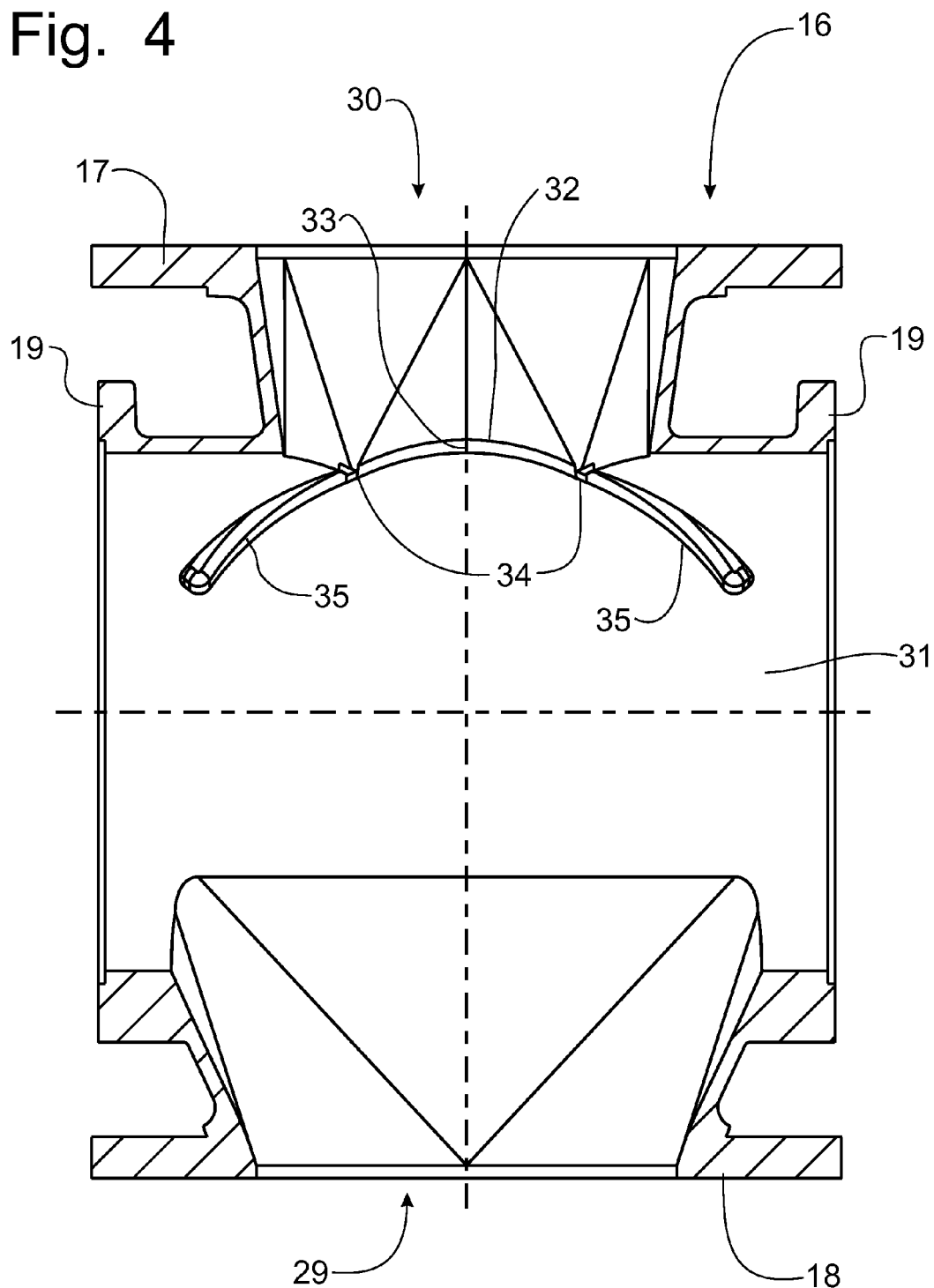
FIG. 4 is a cross-sectional view of the rotor housing corresponding to lines 4-4 of FIG. 3 to provide a better view of the grooves formed on the interior surface of the cylindrical rotor housing.
Figure 5:
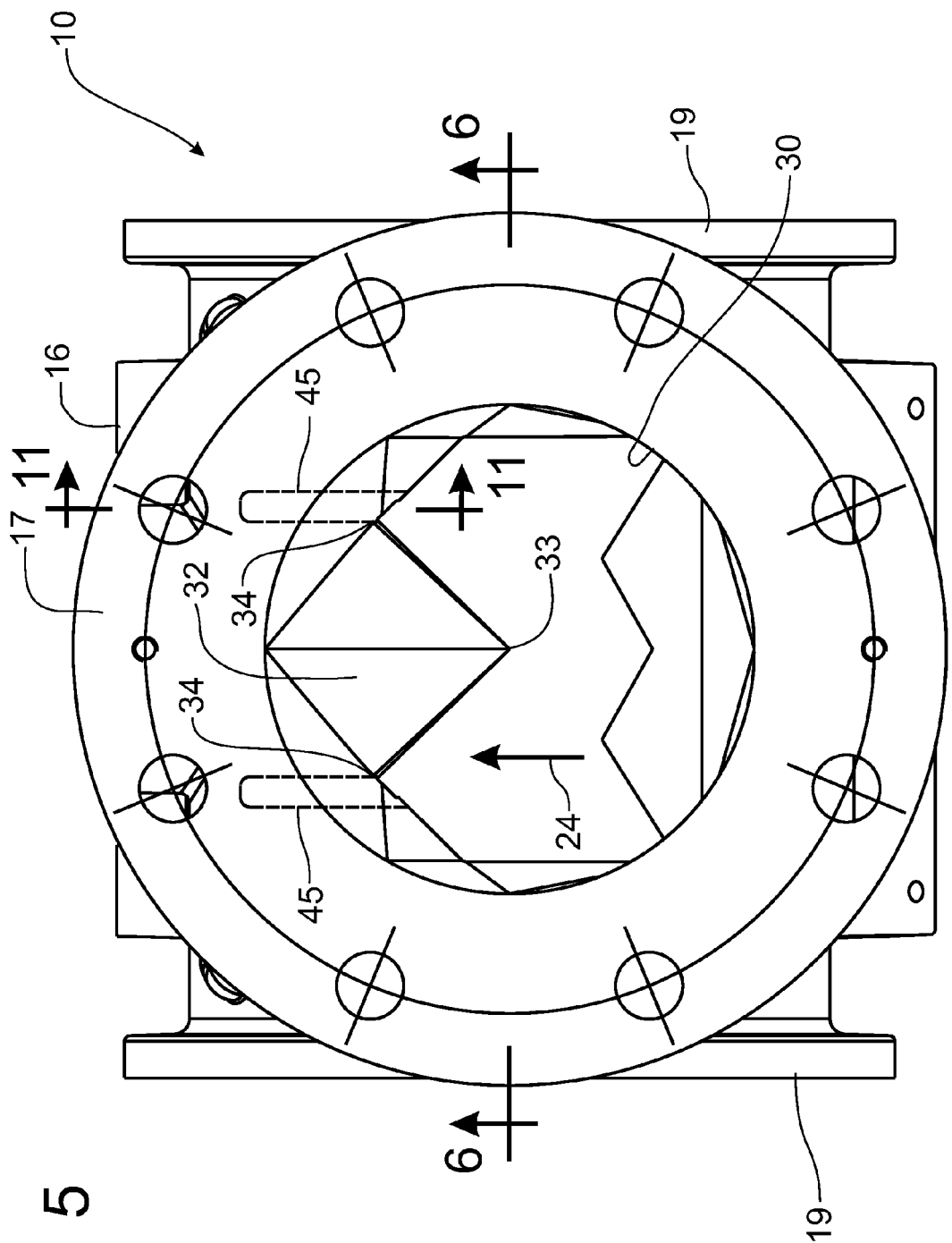
FIG. 5 is an enlarged top plan view of a second embodiment of the rotor housing incorporating the principles of the instant invention.
Figure 6:
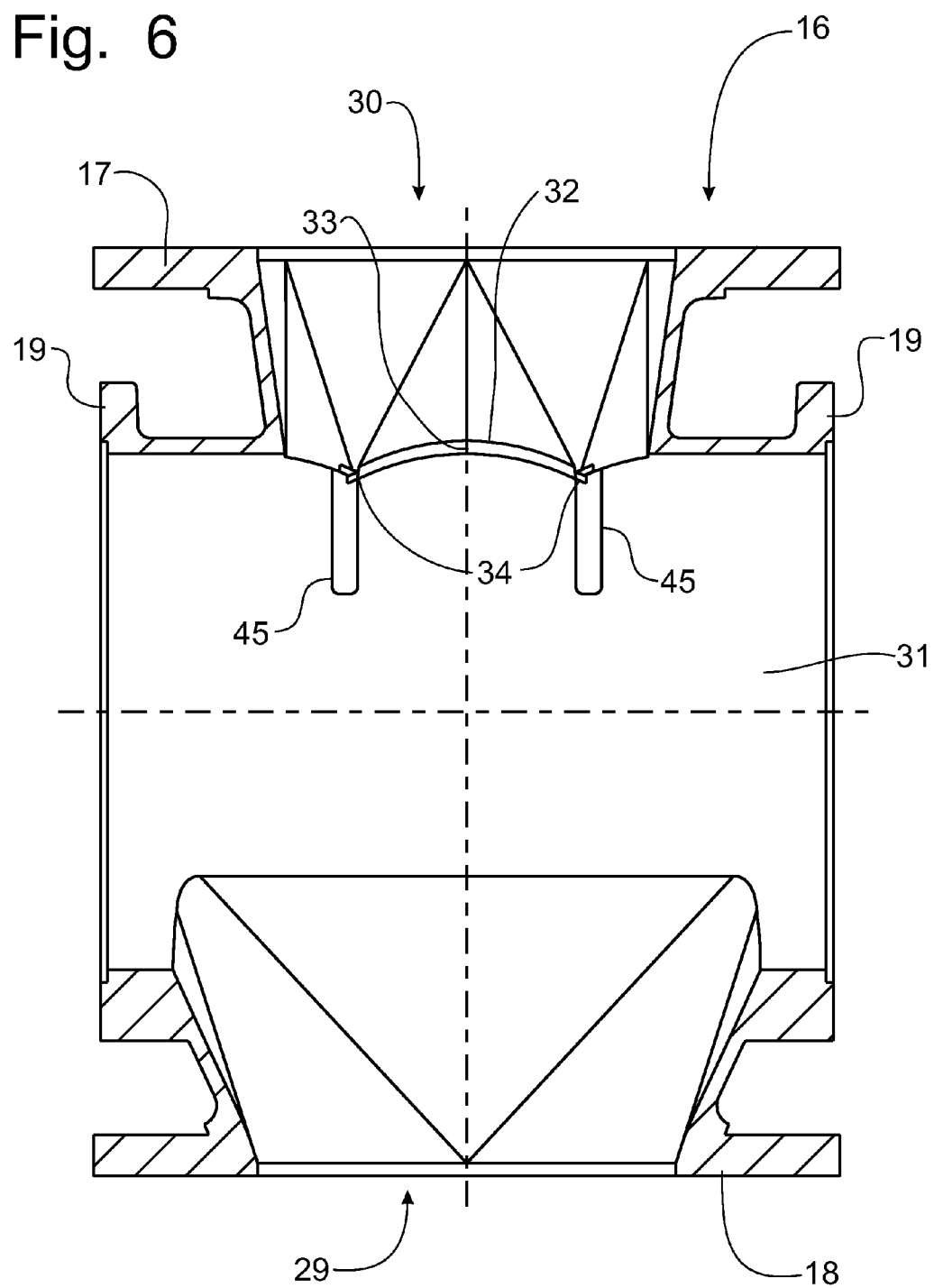
FIG. 6 is a cross-sectional view of the rotor housing corresponding to lines 6-6 of FIG. 5 to provide a better view of the grooves formed on the interior surface of the cylindrical rotor housing.
Figure 7:
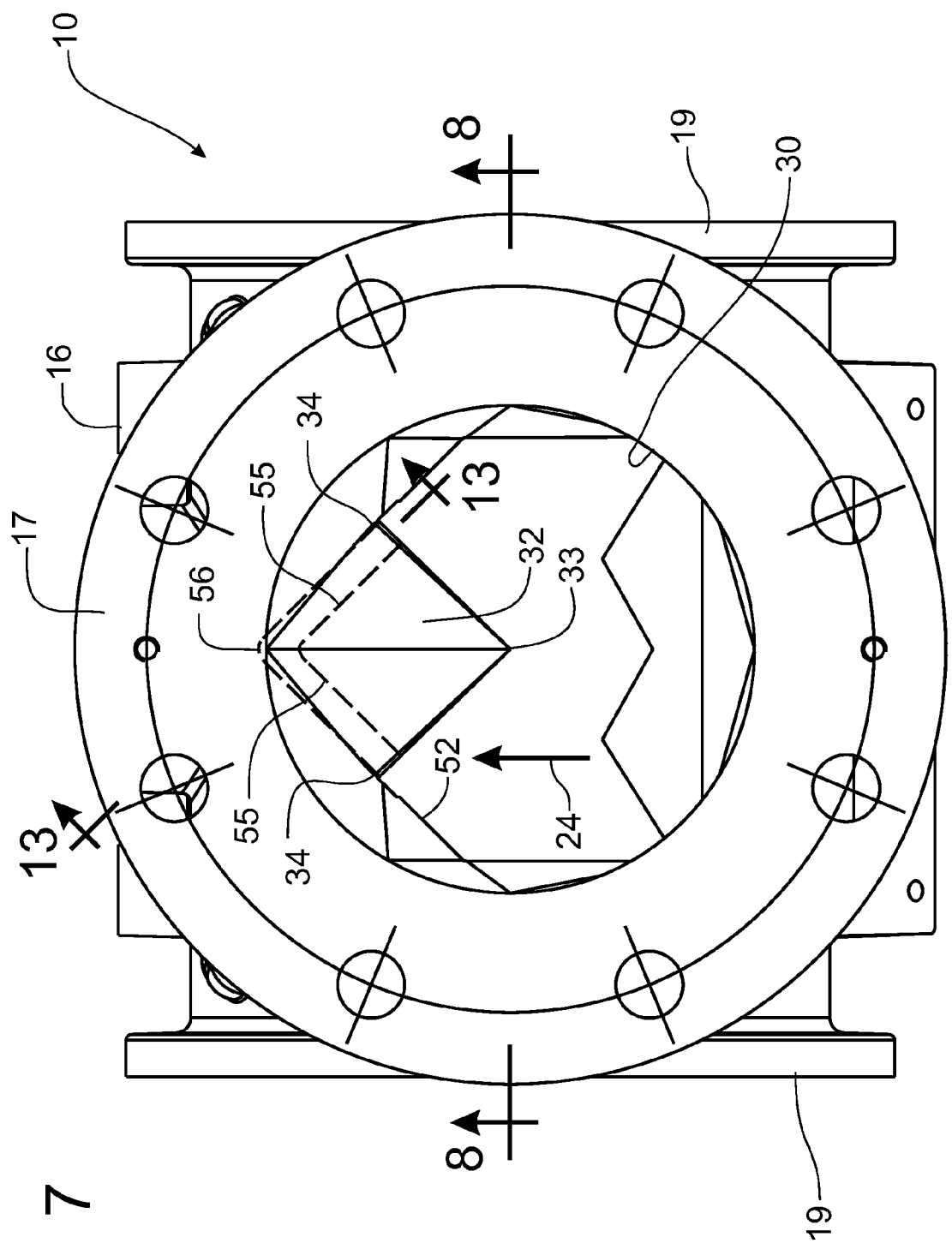
FIG. 7 is an enlarged top plan view of a third embodiment of the rotor housing incorporating the principles of the instant invention.
Figure 8:
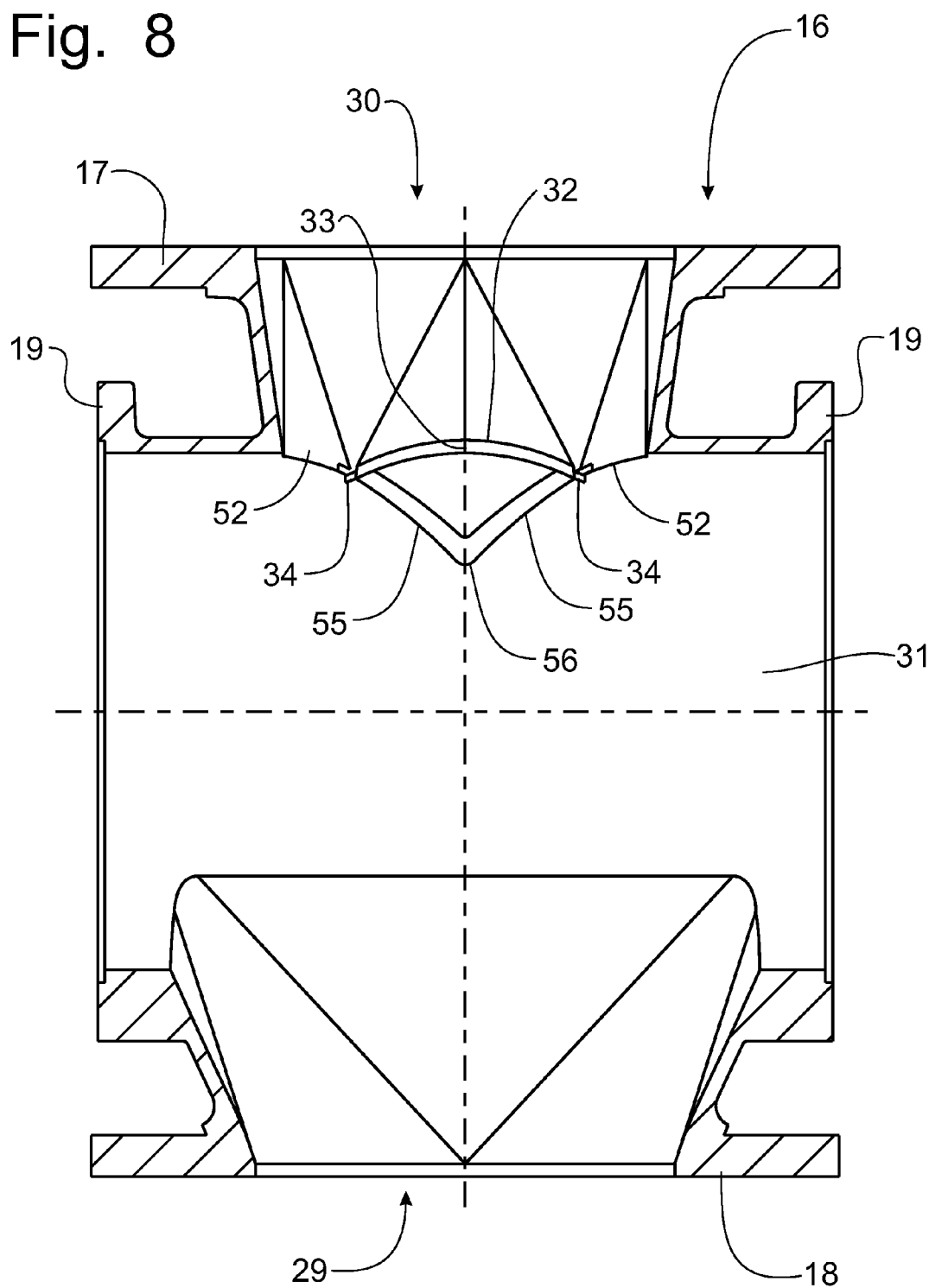
FIG. 8 is a cross-sectional view of the rotor housing corresponding to lines 8-8 of FIG. 7 to provide a better view of the grooves formed on the interior surface of the cylindrical rotor housing.

Referring to FIGS. 1 and 2, a rotary valve incorporating the principles of the instant invention can best be seen. The rotary valve 10 is operably positionable between a supply hopper 12 providing a supply of particulate material, such as plastic pellets and the like, to be fed into the conduit 15 of a pneumatic conveying system to move the particulate material to a remote location serviced by the pneumatic conveying system. The purpose of the rotary valve 10 is to meter the flow of particulate material into the conduit 15 in a manner that the pressurized air within the pneumatic conveying system is retained within the conduit to provide a fluidized flow of the particulate material to the remote location. The rotary valve 10 accomplishes this function through the operation of an interior rotor assembly 20 that is formed with radially extending vanes 25 that define chambers or pockets 27 between the vanes 25 to receive the particulate material from the supply hopper 12 and move the particulate material to the conduit 15. The close proximity of the tips 26 of the vanes 25 to the mating interior surface of the cylindrical housing 16 restricts the escape of pressurized air from the conduit 15 past the rotor assembly 20.

The housing 16 is formed in a generally cylindrical shape to support the rotational movement of the internal rotor assembly 20, as will be described in greater detail below. The housing 16 is formed with a mounting flange 17 at the top of the cylindrically-shaped housing 16 to permit the supply hopper 12 to be coupled thereto so that particulate material will be efficiently fed into the rotary valve 10. The housing 16 is also formed with a mounting flange 18 at the bottom of the cylindrically-shaped housing 16 to be coupled to the conduit 15 so that particulate material can flow by gravity from the filled pockets 27 into the pressurized conduit 15 of the pneumatic conveying system. The opposing sides of the cylindrically-shaped housing 16 are also formed with mounting flanges 19 that allow the coupling of bearing caps 19a that support respective bearings (not shown) that rotatably support the central shaft 21 of the rotor assembly 20.

The rotor housing 16 is best seen in FIGS. 1-8. The inlet opening 30 through the top flange 17 is formed with a triangular ridge 32 that meets at an apex 33 within the inlet opening 30 and extends from the apex 33 to an intersection with the interior surface 31 of the housing 16 to form a pinch point 34. The vanes 25 of the rotor assembly 20 sweep past the apex 33 in the direction of the arrow 24 such that particulate pellets do not get trapped between the vanes 25 and the apex 33 of the triangular ridge 32. The triangular ridge 32 pushes particulate pellets to the respective sides of the triangular ridge 32 to fall into the chambers 27 and be carried around the rotor assembly 20 for deposit into the pneumatic system conduit 15. The intersection of the lines of the triangular ridge 32 extending in the direction of rotation of the rotor assembly 20 creates a pinch point 34 at either side of the triangular ridge 32 where particulate pellets could become trapped between the triangular ridge 32 and the vanes 25 of the rotor assembly 20. This trapping of particulate pellets typically results in some disintegration of the pellets, and thus creates fines in the particulate material as the particulate material is being transferred around the rotary valve 10 to the pneumatic system 15.

To avoid particulate pellets from getting trapped at the pinch points 34, the interior surface 31 of the rotor housing 15 is formed with a groove channel that is formed as a depression into the otherwise smooth interior surface 31 of the rotor housing 16. The groove channel functions as a relief to any particulate pellets that might otherwise become trapped at the pinch points 34. A pellet that would otherwise be trapped would now pass into the groove channel and be passed by the rotor vane 25 for subsequent entrainment in the next chamber 27 in the rotor assembly 20. In general terms, this relief groove is disclosed in Taiwan Patent No. M384858, granted on Nov. 17, 2010, in which the groove extends from the pinch points in a direction that is in alignment with the lines of the triangular ridge 32. The groove structure of the Taiwan Patent No. M384858 includes a proximal wall that is recessed into the interior surface 31 of the cylindrical housing 16 and extends at a uniform depth to a distal wall.

Figure 10:
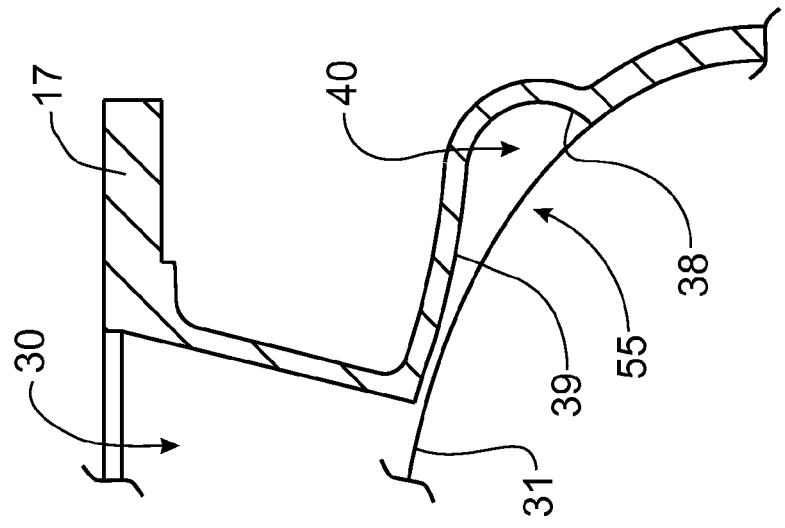
FIG. 10 is a partial cross-sectional view of the rotor housing depicting a second groove configuration for the embodiment of the invention shown in FIG. 3.
Figure 9:
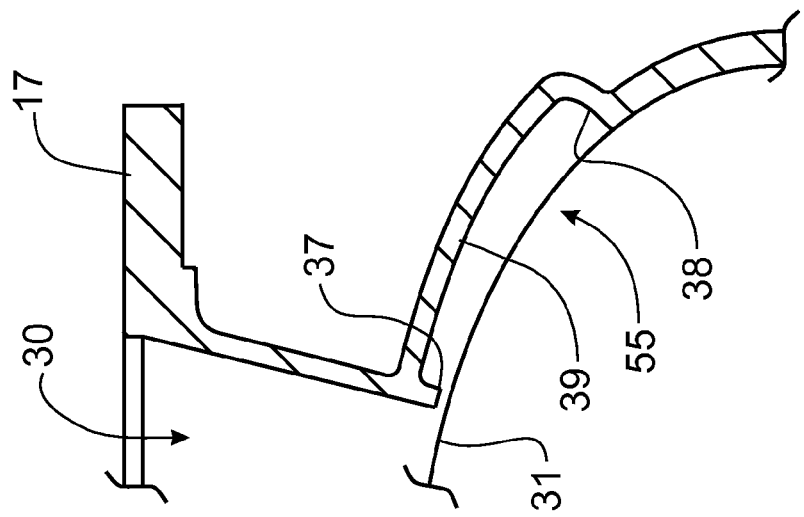
FIG. 9 is a partial cross-sectional view of the rotor housing depicting a first groove configuration for the embodiment of the invention shown in FIG. 3.

The first embodiment of the instant invention is shown in FIGS. 3, 4, 9 and 10. The groove 35 is formed as a depression into the interior surface 31 of the cylindrical rotor housing 16 against which the rotor assembly 20 operates. The orientation of the groove 35 is in alignment with the sides of the triangular ridge 32 so that the rotor vanes 25 sweeping particulate pellets along the edge of the triangular ridge 32 will continue the direction of the pellets into the groove 35. Of course, the grooves 35 will be curved along the arcuate interior surface 31 of the rotor housing 16. The cross-sectional shape of the groove 35 can be formed in alternate configurations, as is shown in FIGS. 9 and 10.

In FIG. 9, the groove 35 is formed with a proximal wall 37 that does not extend completely to the interior surface 31 of the rotor housing 16, allowing a relief for the passage of pellets into the groove 35. The groove 35 then has a first minimal depth immediately after the proximal wall 37 into which the pellets can drop. The groove 35 is formed with a channel ceiling 39 that extends along the length of the groove 35 to the distal wall 38. The distal wall 38 defines a depth of the groove 35 that is greater than the depth of the groove 35 at the proximal wall 27. Therefore, the channel ceiling 39 can be formed with a slight curve, as is depicted in FIG. 9, to construct the groove 35 with an increasing depth from the proximal wall 37 to the distal wall 38.

Alternatively, the groove 35 can be formed with a spiral channel ceiling 39, as is depicted in FIG. 10. In the configuration shown in FIG. 10, the proximal wall can be eliminated, or reduced substantially in height, leaving the same relief clearance that the configuration in FIG. 9 provided for the movement of particulate pellets into the groove 35. Accordingly, the channel ceiling 39 can spiral away from the rotor assembly 20 providing an increasing depth to the groove 35 and facilitating the movement of pellets into the groove 35 by the rotor assembly 20. The channel ceiling 39 will then form a rounded end chamber 40 before terminating at the distal wall 38.

The formations of the grooves 35 with an increasing depth toward the distal wall 38 allows the accumulated particulate pellets to compress into the groove 35, particularly with respect to the alternative configuration in FIG. 10 with the rounded end chamber 40. The passage of the rotor vanes 25 along the groove 35 will draw the accumulated pellets out of the groove 35 and into the following chamber 27 to be swept away into the pneumatic conduit 15. Furthermore, the lack of a proximal wall 37 in the alternative configuration shown in FIG. 10 with a depth of groove 35 immediately following eliminates the creation of small eddy currents of air that hinder the effectiveness of the utilization of a groove 35.

A second embodiment of the groove 45 is shown in FIGS. 5, 6, 11, 11A and 12. The orientation of the groove 45 differs from the first embodiment of the groove in that the groove 45 extends circumferentially away from the pinch points 34 perpendicularly to the path of movement of the rotor vanes 25. This orientation of the groove 45 will intercept the particulate pellets moving along the walls of the triangular ridge 32 and allow the intercepted pellets to move with the rotor vanes 25 in the direction of movement of the rotor vanes into the groove 45.

The preferred cross-sectional configurations of the groove 45 are shown in FIGS. 11-12, and are similar to the configurations described above with respect to the groove 35. The configuration in FIG. 11 is the channel shape disclosed in Taiwan Patent No. M384858 with a short proximal wall 37 providing a relief in the interior surface 31 of the rotor housing 16 for the passage of particulate pellets moved along the side walls of the triangular ridge 32. The groove configuration in FIG. 11 has a channel ceiling 39 formed with substantially the same curve as the interior surface 31 of the rotor housing 16 so that the groove 45 would have a uniform depth to the distal wall 38.

In FIG. 11A, the configuration of the groove 45 includes the short proximal wall 37 with a channel ceiling 39 that is formed to increase the depth of the groove from the proximal wall 37 to the distal wall 38. In FIG. 12, the channel ceiling 39 is formed as a spiral that begins with the what would otherwise have been the end of the proximal wall so that the groove 45 still provides a relief in the interior surface 31 of the rotor housing 16, but the channel ceiling 39 spirals away from the rotational path of the rotor vanes 25 to provide an increasing depth to the groove 45. The groove 45 has a rounded end chamber 40 at the distal wall 38 to provide room for the compression of particulate pellets as the rotor vanes 25 sweep past. The pellets can then rebound into the subsequent following chamber 27 of the rotor assembly 20 after the rotor vane 25 moves past the distal wall 38.

A third embodiment of the groove is depicted in FIGS. 7, 8, 13, 13A and 14 in which the groove 55 is oriented to align with the opposing surface 52 of the inlet throat structure against which the triangular ridge 32 forms the pinch points 34, which is generally perpendicular to the side walls of the triangular ridge 32. The two grooves 55 extend inwardly along the interior surface 31 of the rotor housing and, preferably, join at the distal end at an apex 56. This orientation of the groove 55 accommodates the movement of the particulate pellets along the side structure 52 within the throat of the inlet opening 30 and can sweep the pellets moving along the side wall structure of the triangular ridge 32 by the rotational movement of the rotor vanes 25 into the grooves 55.

The configurations of the grooves 55 are shown in FIGS. 13, 13A and 14 and are identical to the configurations described above with respect to the grooves 45, except that the distal walls 38 of the grooves 55 are formed together at the apex 56. In the configurations depicted in FIGS. 13A and 14, the depth of the grooves increases from the inlet opening 30 to the apex 56. In the configuration of FIG. 13, the channel ceiling 39 is formed with substantially the same arcuate curve as the interior surface 31 of the rotor housing 16 so that the depth of the groove 55 is substantially uniform from the proximal wall 37 to the distal wall 38 at the apex 56. In the configuration of FIG. 13A, the channel ceiling 39 defines an increasing depth to the groove 55 from the proximal wall 37 to the distal wall 38 at the apex 56. In FIG. 14, the channel ceiling extends along an upwardly spiraling path from the relief at the inlet opening 30 to terminate at the rounded end chamber 40 formed at the apex 56. Thus, the converging grooves 55 will terminate in a common rounded end chamber 40 located at the apex 56.

In operation, the grooves 35, 45, 55 provide a relief at the pinch points 34 to allow particulate pellets that could be otherwise trapped between the rotor vanes 25 and the pinch points 34 to pass into the groove 35, 45, 55 without causing damage to the pellet, which creates fines. Two of the configurations of the grooves 35, 45, 55 provide an increasing depth of the groove 35, 45, 55 in the direction of movement of the rotor vanes 25 so that the groove 35, 45, 55 will not compact with particulate pellets. Instead, the particulate pellets compress as the rotor vane 25 passes and release to be drawn back into the subsequent rotor chamber 27 for transfer to the pneumatic conduit 15. In addition, the lack of compaction of the pellets within the groove 35, 45, 55 facilitates a subsequent cleaning of the rotor housing 16 when the rotary valve 10 is to be used for a different product, as a water spray would be effective to remove the presence of the previous particulate material being transferred to the conduit 15.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A rotary valve housing comprising:
   an upper inlet opening for receiving particulate material into the housing and a lower outlet opening for discharging said particulate material from the housing, said housing defining a generally cylindrical interior chamber having a cylindrical interior surface cooperable with a rotatable rotor assembly to convey particulate material from said inlet opening to said discharge opening;
   at least one pinch point within said upper inlet opening; and
   a groove extending from each said pinch point in the direction of rotation of said rotor assembly and being formed as a depression into said interior surface of said cylindrical interior chamber, each said groove having a depth dimension that increases along a length dimension from a proximal end adjacent said inlet opening to a distal end where a maximum depth dimension is located.

2. The rotary valve housing of claim 1 wherein each said groove is oriented in the direction of rotation of said rotor assembly.

3. The rotary valve housing of claim 2 wherein each said groove includes a channel ceiling formed as a spiral extending from said proximal end and terminates at a distal wall at said distal end.

4. The rotary valve housing of claim 3 wherein each said groove includes a rounded end chamber at said distal end.

5. The rotary valve housing of claim 3 wherein each said groove includes a proximal wall at said proximal end, each said groove having a minimal depth to said channel ceiling adjacent said proximal wall.

6. The rotary valve housing of claim 1 wherein each said groove is oriented at an angle that extends toward a centerline of said interior chamber.

7. The rotary valve housing of claim 6 wherein at least two of said grooves intersect at an apex.

8. The rotary valve housing of claim 6 wherein each said groove includes a channel ceiling formed as a spiral extending from said proximal end and terminates at a distal wall at said distal end.

9. The rotary valve housing of claim 8 wherein each said groove includes a rounded end chamber at said distal end.

10. The rotary valve housing of claim 8 wherein each said groove includes a proximal wall at said proximal end, each said groove having a minimal depth to said channel ceiling adjacent said proximal wall.

11. The rotary valve housing of claim 1 wherein each said groove is oriented at an angle that extends away from a centerline of said interior chamber.

12. The rotary valve housing of claim 11 further comprising a triangular ridge formed within said upper inlet opening and defining at least one pinch point within said upper inlet opening, said triangular ridge having side edges extending outwardly from a central apex at a sweep angle relative to the rotor vanes rotating past said triangular ridge to the respective said pinch points, each said groove being aligned with said side edges and extending at said sweep angle.

13. The rotary valve housing of claim 12 wherein each said groove includes a channel ceiling formed as a spiral extending from said proximal end and terminates at a distal wall at said distal end.

14. The rotary valve housing of claim 13 wherein each said groove includes a rounded end chamber at said distal end.

15. The rotary valve housing of claim 13 wherein each said groove includes a proximal wall at said proximal end, each said groove having a minimal depth to said channel ceiling adjacent said proximal wall.

16. A rotary valve housing comprising:
an upper inlet opening for receiving particulate material into the housing and a lower outlet opening for discharging said particulate material from the housing, said housing defining a generally cylindrical interior chamber having a cylindrical interior surface cooperable with a rotatable rotor assembly to convey particulate material from said inlet opening to said discharge opening;
at least one pinch point within said upper inlet opening; and
a groove extending from each said pinch point in the direction of rotation of said rotor assembly and being formed as a depression into said interior surface of said cylindrical interior chamber, each said groove having a depth dimension that increases from a proximal end adjacent said inlet opening to a distal end, each said groove including a channel ceiling formed as a spiral extending from said proximal end and terminates at a distal wall at said distal end.

17. The rotary valve housing of claim 16 wherein each said groove is oriented at an angle that extends away from a centerline of said interior chamber.

18. The rotary valve housing of claim 17 further comprising a triangular ridge formed within said upper inlet opening and defining at least one pinch point within said upper inlet opening, said triangular ridge having side edges extending outwardly from a central apex at a sweep angle relative to the rotor vanes rotating past said triangular ridge to the respective said pinch points, each said groove being aligned with said side edges and extending at said sweep angle.

19. The rotary valve housing of claim 18 wherein each said groove includes a rounded end chamber at said distal end.

20. The rotary valve housing of claim 18 wherein each said groove includes a proximal wall at said proximal end, each said groove having a minimal depth to said channel ceiling adjacent said proximal wall.

21. A rotary valve housing comprising:
an upper inlet opening for receiving particulate material into the housing and a lower outlet opening for discharging said particulate material from the housing, said housing defining a generally cylindrical interior chamber having a cylindrical interior surface cooperable with a rotatable rotor assembly to convey particulate material from said inlet opening to said discharge opening;
at least one pinch point within said upper inlet opening; and
a groove extending from each said pinch point in the direction of rotation of said rotor assembly and being formed as a depression into said interior surface of said cylindrical interior chamber, each said groove having a depth dimension that increases from a proximal end adjacent said inlet opening to a distal end, each said groove including a proximal wall at said proximal end, each said groove having a minimum depth dimension to said channel ceiling adjacent said proximal wall with said depth dimension increasing along a length dimension from said proximal end adjacent said inlet opening to said distal end where a maximum depth dimension is located, said maximum depth dimension being greater than said minimum depth dimension.

22. The rotary valve housing of claim 21 wherein each said groove includes a channel ceiling formed as a spiral extending from said proximal end and terminates at said distal end.

23. The rotary valve housing of claim 22 wherein each said groove includes a rounded end chamber at said distal end.

24. The rotary valve housing of claim 23 wherein each said groove is oriented at an angle that extends away from a centerline of said interior chamber.

25. The rotary valve housing of claim 24 further comprising a triangular ridge formed within said upper inlet opening and defining at least one pinch point within said upper inlet opening, said triangular ridge having side edges extending outwardly from a central apex at a sweep angle relative to the rotor vanes rotating past said triangular ridge to the respective said pinch points, each said groove being aligned with said side edges and extending at said sweep angle.

\* \* \* \* \*